United States Patent [19]

Henry

[11] Patent Number: 4,483,126
[45] Date of Patent: Nov. 20, 1984

[54] ADJUSTABLE DRIVE MECHANISM

[75] Inventor: Nelson R. Henry, Decatur, Ga.

[73] Assignee: The Woodman Company, Inc., Decatur, Ga.

[21] Appl. No.: 349,517

[22] Filed: Feb. 17, 1982

[51] Int. Cl.$^3$ .......................... B65B 51/26; B65B 51/30
[52] U.S. Cl. .......................................... 53/551; 53/554; 74/40; 74/828
[58] Field of Search .................. 53/551, 552, 554, 389; 74/834, 828, 40

[56] References Cited

U.S. PATENT DOCUMENTS

| | | |
|---|---|---|
| 745,917 | 12/1903 | Shafer . |
| 983,843 | 2/1911 | Sewell . |
| 1,826,498 | 10/1931 | Bignell . |
| 2,960,808 | 11/1960 | Pike . |
| 3,027,696 | 4/1962 | Leasure ............................. 53/552 X |
| 3,055,154 | 9/1962 | Markley et al. . |
| 3,266,216 | 8/1966 | Van Den Bos ....................... 53/551 |
| 3,525,193 | 8/1970 | Cutler et al. . |
| 3,668,815 | 6/1972 | Henry et al. . |
| 4,281,556 | 8/1981 | Weishew ......................... 74/828 X |

Primary Examiner—Horace M. Culver
Attorney, Agent, or Firm—King, Liles and Schickli

[57] ABSTRACT

An adjustable drive mechanism for reciprocating a pair of sealing jaws in a packaging apparatus and controlling the stroke length includes a drive belt operatively connected to move the carriage and jaws in the up and down direction. A movable pulley assembly interconnects the drive belt ends and is attached to a working arm oscillated by a linkage arrangement. The linkage arrangement includes a rocker oscillated with a crank and connecting rod. A control link pivotally connected to the rocker completes the linkage and deflects to allow raising of the working arm and driving the sealing jaws on a downward draw stroke. The upper end of the control link constitutes an adjustable pivot to vary the degree of movement imparted by the working arm to the drive belt. The adjustable pivot is carried by an annular adjustment ring mounted within an annular guide groove of a mounting plate. A control rod is provided to rotate the ring in the guide groove to selectively reposition the movable pivot for adjusting the stroke length while the apparatus is operating without affecting the home position of the sealing jaws.

15 Claims, 12 Drawing Figures

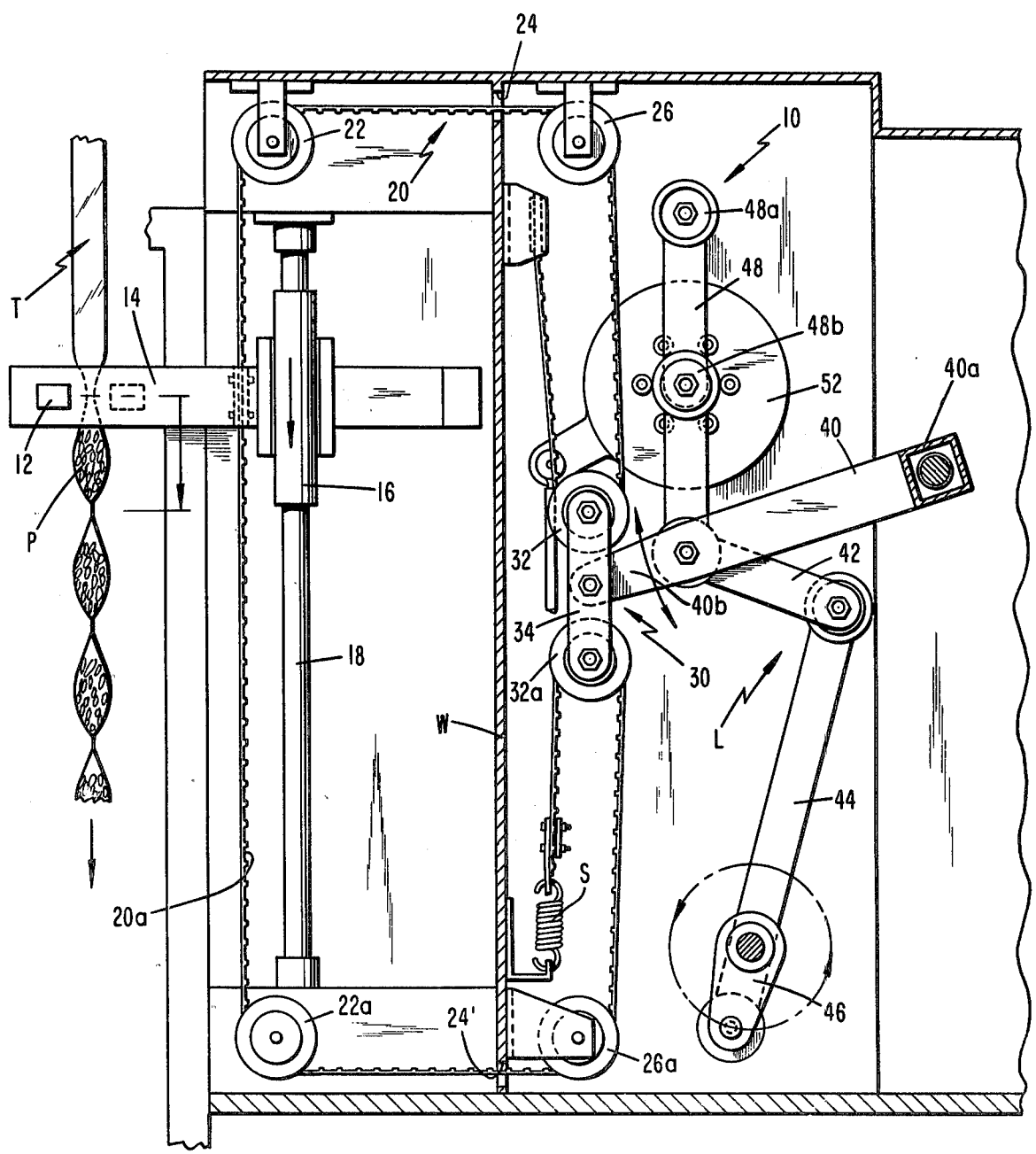

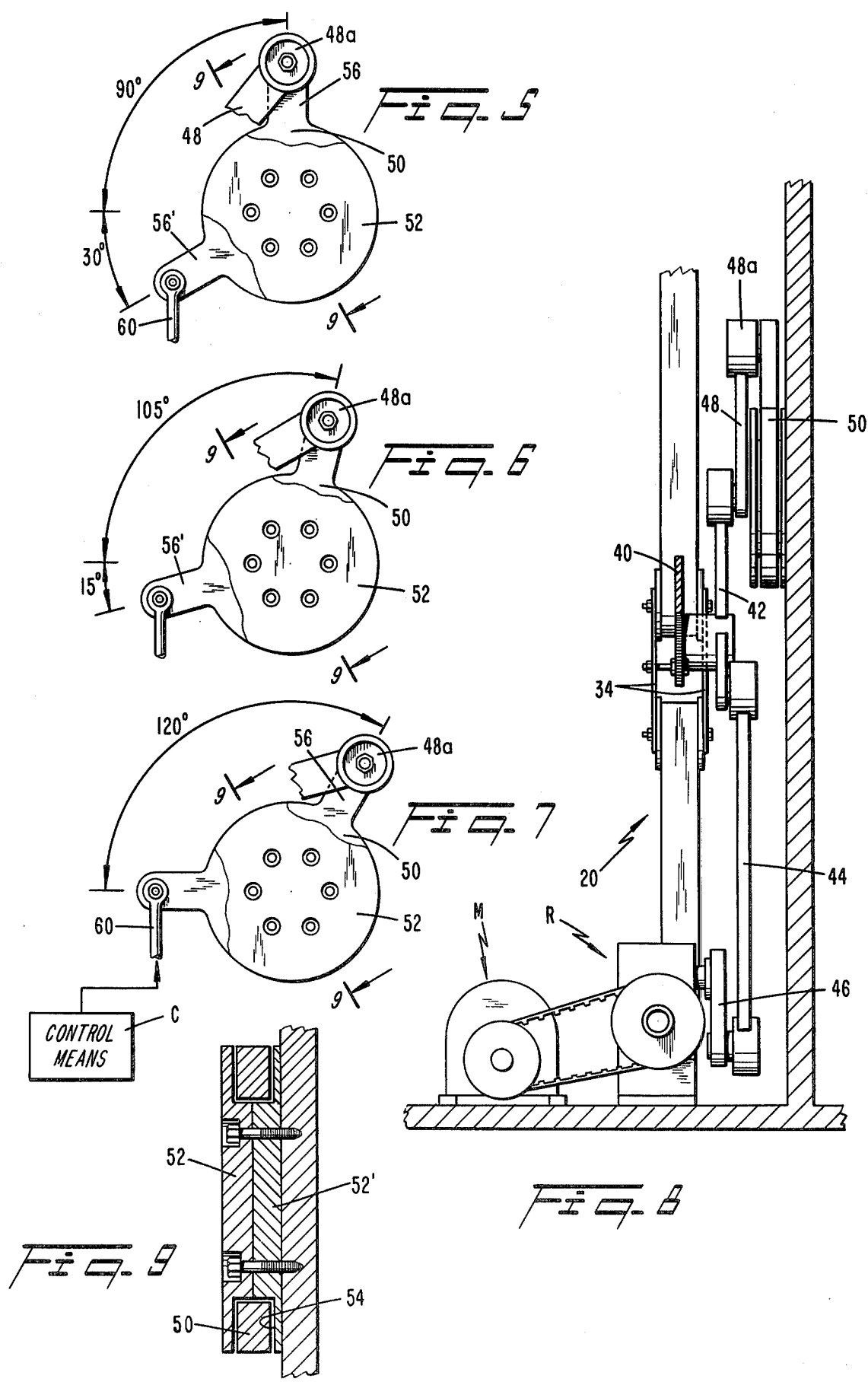

ADJUSTABLE DRIVE MECHANISM

BACKGROUND OF THE INVENTION

This invention relates generally to drive mechanisms for imparting oscillating/reciprocating motion to a part in a machine and, more particularly, to an adjustable reciprocating drive mechanism including means for controlling the stroke length of sealing jaws in a form and fill packaging apparatus.

In form and fill packaging apparatus, a continuous web of sheet material is transformed into a tube for packaging weighed or volumetrically controlled charges of product. The tube is separated into individual packages with transverse seals formed below and above the charge to complete the package which is then severed from the continuous tube.

In packaging relatively light and irregularly shaped products, such as potato chips, one such apparatus is disclosed in U.S. Pat. No. 3,668,815 to Henry et al, assigned to the same assignee as the present invention. In that appratus, gripping members engaging the tube are provided to form a temporary seal. The product being packaged is introduced into the open end of the tube. After settling the packaged product, a pair of sealing jaws engage the tube to form a transverse heat seal to fully seal the contents. While engaging the packaging tube, the sealing jaws move in a downward drawing stroke to draw an additional package length of tube for the next packaging cycle. At the bottom of the drawing stroke the sealing jaws are withdrawn for return to the sealing station. The stroke length of the sealing jaws corresponds to the desired package length.

The packaging apparatus of the type disclosed in U.S. Pat. No. 3,668,815 includes a drive mechanism that moves the sealing jaws in reciprocating movement and allows for adjustment in the stroke length to run different sized bags. The drive mechanism basically includes a power lever oscillated by a connecting rod and crank mechanism. An adjustable pitman is attached to the power lever to oscillate pairs of drive levers and connecting arms interconnected to the sealing jaw carriage. The pitman comprises two slidable links and is adjustable to vary the upper limit or home position. The power lever includes an arcuate slot to readjust the stroke length of the sealing jaws.

While this arrangement is effective to allow adjustment of the sealing jaw carriage, it is necessary to stop the packaging machine and interrupt production to make the adjustment. In addition, this arrangement of parts requires an initial adjustment to give a rough estimation of the required stroke length; subsequent adjustments being necessary to properly set the sealing jaws in the final position and to assure the proper stroke.

The oscillating power lever and arm arrangement connecting the pitman to the sealing jaws tends to increase the cost of the apparatus. Close tolerances are required for these parts to properly interconnect the sealing jaws to the drive mechanism to achieve the relatively precisional movement of the sealing jaws, further adding to the cost. Furthermore, the extra weight and the movement of these parts in the same relative direction increases the momentum that must be overcome at the ends of the stroke adding to the power required and increasing the wear of the parts.

SUMMARY OF THE INVENTION

It is accordingly an object of the present invention to provide an adjustable drive mechanism for driving an oscillating/reciprocating part in a machine that is capable of adjusting the stroke length without stopping the machine.

Another object of the invention is to provide an adjustable drive mechanism for controlling the stroke length of sealing jaws in a form and fill packaging apparatus to run different sized packages during operation.

Yet another object is to provide an adjustable drive mechanism to easily adjust the stroke length of the sealing jaws in a rapid and precise manner while maintaining the "home" position of the carriage.

Still a further object is to provide an adjustable drive mechanism that is relatively inexpensive to manufacture and capable of reliable operation.

Additional objects, advantages and novel features of the invention will be set forth in detail in part in the description which follows and in part will become apparent to those skilled in the art upon examination of the drawing, or may be learned by practice of the invention. The objects and advantages of the invention may be realized and obtained by means of the instrumentalities and combinations particularly pointed out in the appended claims.

The adjustable drive mechanism of the present invention is capable of driving an oscillating part in a machine and controlling the stroke length of the oscillating part. The mechanism also includes a drive belt operatively connected to convert the motion to reciprocating movement.

A linkage arrangement operatively connected to the drive belt includes a working arm connected to drive the belt. A control link having an adjustable or movable pivot controls the amount of movement imparted by the working arm to the belt. Control means is provided for moving or displacing the movable pivot to adjust the stroke length of the oscillating part while maintaining the "home" position of the part during machine operation.

The preferred use of the adjustable drive mechanism is in a form and fill apparatus of the type having a pair of sealing jaws for forming top and bottom seals in the product packages. The sealing jaws draw a packaging tube downwardly to form the successive packages. To drive the sealing jaws in up and down reciprocating movement, part of the drive belt extends parallel to the line of travel of the sealing jaws. The belt passes around pairs of fixed guide pulleys for connection to a movable pulley assembly carried on the working arm.

The movable pulley assembly includes a pair of pulleys respectively engaging upper and lower belt loop portions of the drive belt. A pair of link members interconnect the pulleys to each other. A tensioning spring connected to the drive belt maintains the belt in a slack-free condition to assure precise control of the carriage.

The forward or distal end of the working arm is connected to the movable pulley assembly. The rear end of the working arm is secured to the support frame of the packaging apparatus and constitutes a fixed pivot. A rocker is pivotally secured to the working arm intermediate the ends and is oscillated with a crank and connecting rod. The control link is connected to the upper rocker arm. The upper end of the control link constitutes the adjustable pivot.

During upward crank rotation, the rocker and control link move upwardly. This motion raises the working arm and transmits corresponding movement to the drive belt for driving the carriage and thus the sealing jaws in a downward drawing stroke. As the movement continues, downward crank rotation pivots the rocker and control link to lower the working arm, raising the carriage in an upward return stroke. This opposite movement of the linkage arrangement including the working arm and the carriage is substantially self-balancing providing smoother machine operation and less wear of the parts.

An annular adjustment ring is provided within an annular guide groove of a mounting plate. The mounting plate is attached to the support frame above the working arm. The adjustment ring includes a radially extending arm carrying the upper adjustable pivot. A control rod is attached to a second radially extending arm to rotate the ring within the groove. In this manner, the movable pivot can be repositioned while the machine is running to control the degree of movement imparted by the working arm to the drive belt.

The adjustable pivot arm moves on an arc so that the pivot connection between the control link and the rocker always returns to the same position when the crank is in the lower position. This structure assures that the sealing jaw carriage automatically returns to the same home position regardless of the adjusted position of the adjustment ring.

BRIEF DESCRIPTION OF THE DRAWING

FIG. 1 is a side view of the adjustable drive mechanism showing the operative connection of the adjustable linkage to the drive belt to control movement of the sealing jaws;

FIGS. 5–7 are partial, plan views of the adjustable pivot positioned as respectively shown in FIGS. 2A–4A;

FIG. 8 is an end plan view of the adjustable drive mechanism of the invention; and FIG. 9 is a partial sectional view taken through the line 9—9 of FIG. 7 showing engagement of the annular adjustment ring within the annular guide groove of the mounting plate.

DETAILED DESCRIPTION OF THE DRAWINGS

Figure 2A:
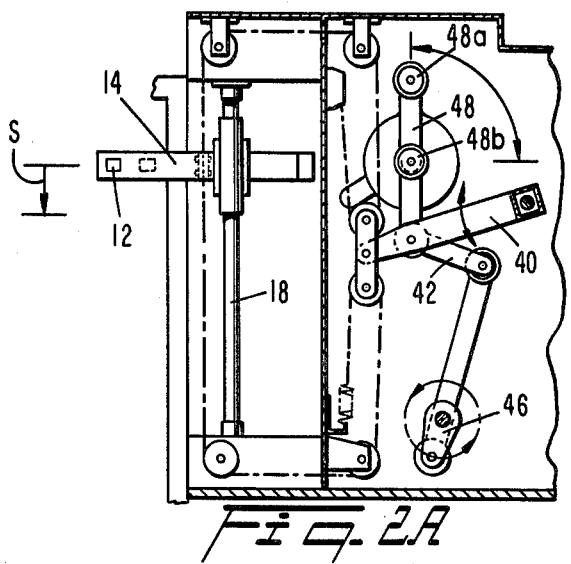
FIGS. 2A and 2B are side plan views respectively showing the sealing jaws in the upper home position and lower position of the stroke and corresponding relative displacement of the linkage arrangement.

Referring to FIG. 1, the adjustable drive mechanism of the invention, generally designated by reference numeral 10, is shown for preferred use in a packaging apparatus of the type disclosed in U.S. Pat. No. 3,668,815 to Henry et al, incorporated herein by reference. In that apparatus, a pair of sealing jaws 12 are provided to form a transverse bottom/top seal in a continuous tube T. The tube T is formed from packaging film, such as polyethylene film, and receives a charge of product, such as frozen vegetables. After settling, a new length of tube T for a next successive package is formed by downward movement of jaws 12 for the required draw stroke length. A return stroke raises jaws 12 to the home position or upper limit to form the next seal in a continuous process.

Adjustable drive mechanism 10 of the present invention both drives and controls the stroke of the sealing jaws 12 to obtain the desired reciprocating movement. In accordance with the invention, drive mechanism 10 is capable of varying the stroke length of the jaws to run a particular size package without stopping the packaging apparatus to make the adjustment.

The pair of sealing jaws 12 are mounted for up and down reciprocal movement on a carriage 14 attached to slides 16. The slides 16 are supported in sliding engagement on side guideways 18, (see FIG. 1).

A drive belt 20 is provided to move sealing jaws 12 in reciprocating movement along the guideways 18. As best shown in FIG. 1, drive belt 20 includes a vertically extending belt portion 20a located in front of wall W of the apparatus. The belt portion 20a is fixedly attached to sealing jaw carriage 14 to effect movement thereof. The belt passes around a pair of upper and lower guide pulleys 22 and 22a, respectively. Pulleys 22 and 22a are mounted to upper and lower frame support members of the apparatus to orient the belt portion 20a in parallel relation with the guideways 18 providing for low friction movement. Belt 20 extends horizontally from the guide pulleys through wall W at corresponding slotted openings 24 and 24'.

Behind the wall W, the upper and lower parts of guide belt 20 respectively pass around a second pair of fixed guide pulleys 26 and 26a, as shown in FIG. 1. The ends of belt 20 are fixedly attached to wall W to define upper and lower belt loops. The loops receive a movable pulley assembly, generally designated by the reference numeral 30.

The movable pulley assembly 30 serves to impart reciprocating motion from a linkage arrangement L of the invention to drive the belt 20. A pair of pulleys 32 and 32a are secured in spaced relation from each other by a pair of mounting links 34, as best shown in FIG. 8. The upper and lower belt loops respectively extend around pulleys 32 and 32a to form a reciprocating type belt drive.

Figure 2B:
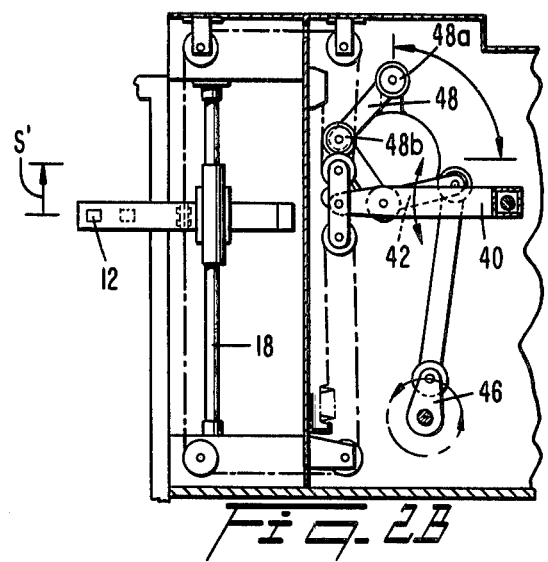

It will be recognized that the movable pulley assembly 30 is capable of up and down oscillating movement (compare FIGS. 2A, 2B; 3A, 3B; 4A, 4B). In response to this oscillating movement, the belt 20 moves around the fixed guide pulleys causing the desired reciprocating movement of sealing jaws 12. The feature of moving the jaws 12 through the intermediary of the drive belt 20 eliminates the need for the extra drive arms, and connecting links as known in the art. As a result, a simplified and more cost effective design is obtained. Additionally, due to the relatively light weight of the belt 20, the momentum required to be overcome at the ends of the stroke is minimal.

A spring S interconnects one end of the belt 20 to wall W to provide constant belt tension. This feature eliminates slack to assure positive belt movement for precise travel of jaws 12 along the travel path of the carriage 14. Furthermore, the spring S allows temporary, increased tension to absorb shock in the system, and thus eliminate deleterious shock or jerking action. As a result, the jaws 12 begin and complete the travel strokes in a gentle and controlled fashion.

In accordance with the invention, the linkage L includes a working arm 40 connected to oscillate the movable pulley assembly 30. As shown in FIG. 1 and 8, the rear end 40a of working arm 40 constitutes a fixed pivot suitably attached to a rear support frame of the packaging apparatus. The forward or distal end 40b of the arm 40 carries the mounting links 34. The working arm 40 oscillates to correspondingly move the assembly 30, in the manner described in more detail below, along an arc having its center at fixed pivot 40a.

To oscillate working arm 40, a rocker 42 is pivotally secured to the arm intermediate the ends 40a and 40b.

The rocker 42 is oscillated by a connecting rod 44 and power crank 46. As shown in FIG. 8, crank 46 is preferably driven by a variable speed reducer R and a motor M. Connecting rod 44 extends upwardly from crank 46 for attachment to the lower arm of rocker 42. A control link 48 is attached to the upper arm of rocker 42 to complete the linkage mechanism. In accordance with the invention, the upper end 48a of the control link constitutes an adjustable pivot to control the amount of movement imparted by working arm 40 to the drive belt 20.

Thus, in operation, working arm 40 is oscillated in the following manner. In the lowermost position (cf. FIGS. 1 and 2A), crank 46 rotates upwardly in the counter-clockwise direction, causing upward displacement of connecting rod 44 and upward oscillating movement of rocker 42. As rocker 42 pivots about its pivot connection on arm 40, the control link 48 is deflected. The pivotal connection 48b between the rocker 42 and control link 48 travels in an arc having its center at the pivot 48a. This movement allows working arm 40 to lift, translating motion to the pulley assembly 30 in the upward direction. As drive belt 20 moves (in low friction rolling engagement around the fixed guide pulleys), sealing jaws 12 travel from the upper home position in a downward drawing stroke (note stroke arrow S in FIG. 2A).

Rotation of crank 46 to its uppermost position (cf. stroke arrow S in FIG. 2A) causes jaws 12 to travel to the lower limit, corresponding to the final length of the product package P (see FIG. 1). Continuing crank rotation back to its lowermost position lowers working arm 40 and raises jaws 12 in the return stroke (FIG. 2B).

To vary the stroke length of jaws 12, an adjustment ring 50 is stationarily mounted to the side support frame above working arm 40. As shown in FIGS. 1 and 9, a pair of circular mounting plates 52 and 52' are fixedly secured to the frame in juxtaposition with each other. The circumferential edges of mounting plates 52 and 52' define an annular guide groove 54. The adjustment ring 50 is fitted within groove 54 in relatively tight frictional engagement.

A pair of arms 56 and 56' extend radially from adjustment ring 50, as shown in FIG. 5-7. The adjustable pivot 48a on control link 48 is attached to the upper arm 56. A control rod, such as rod 60, is attached to the lower arm 56' to rotate the ring 50 within guide groove 54, causing corresponding movement of the pivot 48a. In this unique manner, the adjustable pivot moves in an arc having its center at the central axis of ring 50.

It will be recognized that adjustment ring 50 allows for adjustment of the stroke length by extending the lower limit of the sealing jaws movement. This is accomplished by selectively repositioning the ring 50 and thus the pivot 48a by actuation of control rod 60 by control means C (see FIG. 7), which may be a motor or hand driven jackscrew or similar device. The movement of control link 48 is varied and the degree of oscillation of working arm 40 is altered, as follows.

In the uppermost position, adjustable pivot 48a is positioned above adjustment ring 50, as shown in FIGS. 2A and 5. It will be remembered that the pivotal connection 48b between rocker 42 and control link 48 travels in an arc having a center at adjustable pivot 48a. Thus, during upward crank rotation in the draw stroke, upward movement of working arm 40 is governed by the degree to which pivotal connection 48b vertically rises.

Figure 3A:
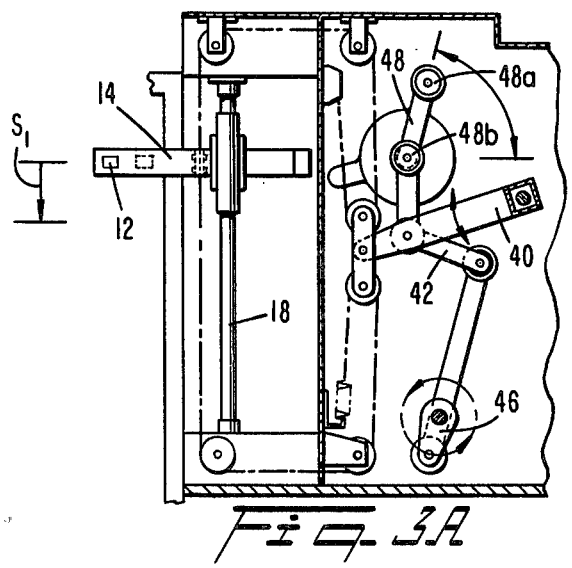
FIGS. 3A and 3B are similar to FIGS. 2A and 2B but show the linkage set for moving the sealing jaws along an increased stroke by setting the adjustable pivot offset from the uppermost vertical position.
Figure 3B:
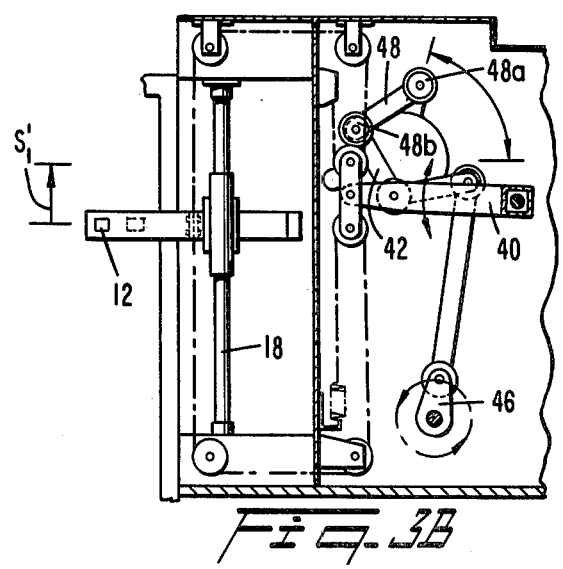

If the pivot 48a is moved in a clockwise direction, such as 15° from the vertical, as shown in FIG. 3A and 6, then from this position, pivotal connection 48b rises at a steeper vertical gradient during crank rotation. The fact that the pivotal connection 48b can rise higher means that the pulley assembly 30 can also rise higher in this setting. As the pulley assembly 30 rises higher, the carriage 14 increases its stroke, as shown by the arrow S1 in FIG. 3A. Note in particular the difference in the angle of inclination of the upper arm of rocker 42 in FIG. 3B as compared to the same part in FIG. 2B.

Figure 4A:
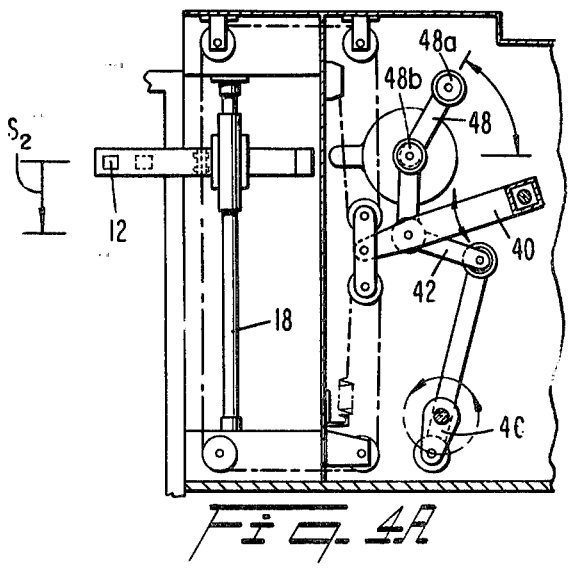
FIGS. 4A and 4B are similar to FIGS. 3A and 3B and show the sealing jaws moving along a yet larger stroke by setting the adjustable pivot further offset from the vertical position.
Figure 4B:
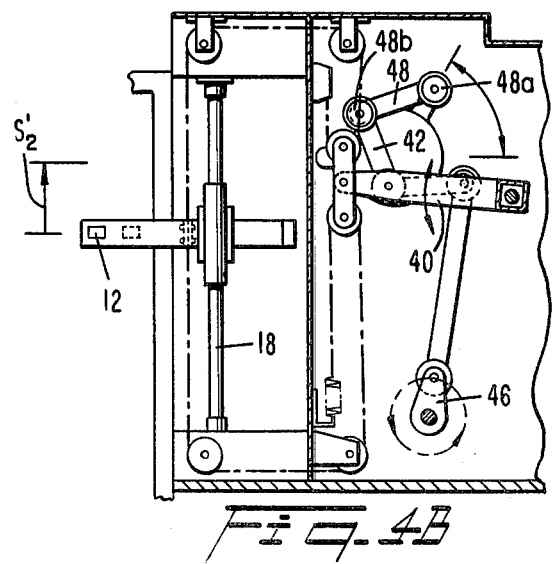

Next, if the linkage is further adjusted by actuation of the control means C to the full 120° position of FIG. 7, then the pivotal connection 48b is allowed to rise even higher in turn allowing the pulley assembly 30 on the arm 40 to extend higher and thereby further increase the stroke S2 (FIG. 4A). It is important that during each of the return strokes S', S1', S2', the movement of the rocker 42 is always assured of returning the pivotal connection 48b to the same position (compare FIGS. 2B, 3B and 4B). This occurs because the pivot 48a is moved on an arc having its center coinciding with the pivotal connection 48b. Thus when the working arm 40 is lowered by the crank 46, it always returns to the same position and through the belt 20 the carriage 14 is thus always carried to the same home position noted in these figures. Of significant importance is the fact that only one adjustment is required and regardless of the adjustment the pivot connection 48b remains centered over the ring 50 and thus always in alignment with the radially extending arm 56 in the home position. There is no requirement for initial adjustment of the machine and in any one of the adjustments the home position of the carriage 14 is automatically retained.

The adjustable drive mechanism 10 including the linkage L of the present invention provides precise movement for the carriage 14 and at the same time allows full adjustment while the machine is operational. The adjustment varies the stroke length S while maintaining the upper or home position at the same place and without further adjustment. With this arrangement, the set up time for the packaging machine to run a particular size bag is very quick. This greatly reduces the down time and the loss of valuable production. The movable pulley assembly 30 provides an efficient driving mechanism for the belt 20, in turn driving the carriage 14. The weight of oscillating/reciprocating parts is greatly reduced, and the linkage L and carriage 14 substantially counterbalance each other, thereby reducing the power required and improving smoothness of operation.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize in the invention in various embodiments and with various modifications as are suited to the particular use contemplated. It is intended that the scope of the invention be defined by the claims appended hereto.

I claim:

1. An adjustable drive mechanism for driving a reciprocating/oscillating part in a machine and controlling the stroke length, comprising:
   (a) moving means operatively connected to the part;
   (b) linkage means operatively connected to drive the moving means, said linkage means including a working arm connected to the moving means and a control link having a selectively adjustable pivot to control the degree of movement imparted by the working arm to the moving means; and
   (c) control means for bodily displacing the movable pivot relative to a first position so as to adjust the stroke length during movement of the reciprocating/oscillating part.

2. A mechanism according to claim 1, wherein said moving means includes a drive belt interconnected between the part and the working arm so as to positively drive the part alternately in opposing directions for improved operating smoothness and speed.

3. A mechanism according to claim 1, wherein said moving means further includes guide pulley means for guiding the belt between the part and the working arm.

4. A mechanism according to claim 3, wherein said moving means further includes a movable pulley assembly interconnecting opposite end portions of the belt to define a reciprocating belt drive.

5. A mechanism according to claim 4, wherein said moving means further includes spring means operatively connected to the belt to provide belt tension and thereby prevent slack.

6. A mechanism according to claim 5, wherein said part includes a carriage, sealing jaws mounted on the carriage in a packaging apparatus for reciprocating action.

7. A mechanism according to claim 1, wherein said linkage means comprises a rocker pivotally connected to the working arm, a crank and connecting rod connected to oscillate the rocker, said control link pivotally connected to the rocker and causing the working arm to oscillate during crank rotation to thereby drive the moving means.

8. A mechanism according to claim 7, wherein said working arm includes a fixed pivot connected to a support frame in the machine, said rocker pivotally attached to the working arm at a point intermediate the fixed pivot and the connection of the working arm to the moving means.

9. A mechanism according to claim 8, wherein said movable pivot is attached to a support frame in the machine above the working arm, causing the rocker and control link to thereby raise and lower the working arm during crank rotation.

10. A mechanism according to claim 9, wherein said machine is a packaging apparatus and said part includes a carriage having a pair of sealing jaws longitudinally movable along a packaging tube positioned to receive a charge of product, said jaws being downwardly movable for a required stroke length and engageable with the tube to draw out a new product package length and being upwardly movable to return to the upper limit of the stroke during downward crank rotation.

11. A mechanism according to claim 10, wherein the pivotal connection between the rocker and control link moves in an arc having a center at the adjustable pivot, repositioning of the pivot causing the path of the arc to vary in relation to the working arm, thereby changing the degree of movement imparted by the working arm to the drive belt to adjust the required stroke length of the sealing jaws.

12. A mechanism according to claim 11, wherein said control means includes an annular adjustment ring and a mounting plate attached to a support frame of the machine, said mounting plate having an annular groove retaining the adjustment ring in frictional engagement.

13. A mechanism according to claim 12, wherein said adjustment ring includes a radially extending arm, said movable pivot being connected to the arm for adjustable positioning during selective rotation of the adjustment ring in the annular guide groove.

14. A mechanism according to claim 13, wherein said annular adjustment ring further includes a second radially extending arm and a control means attached to the arm to thereby rotate the ring in the groove.

15. A mechanism according to claim 13, wherein said arm on said adjustment ring moves in an arc and the center of said ring corresponds to the pivot connection between the control link and the rocker in one position allowing return to substantially the same home position.

* * * * *